No. 815,588. PATENTED MAR. 20, 1906.
O. HILE & C. ROCKE.
ANCHOR.
APPLICATION FILED JUNE 3, 1905.
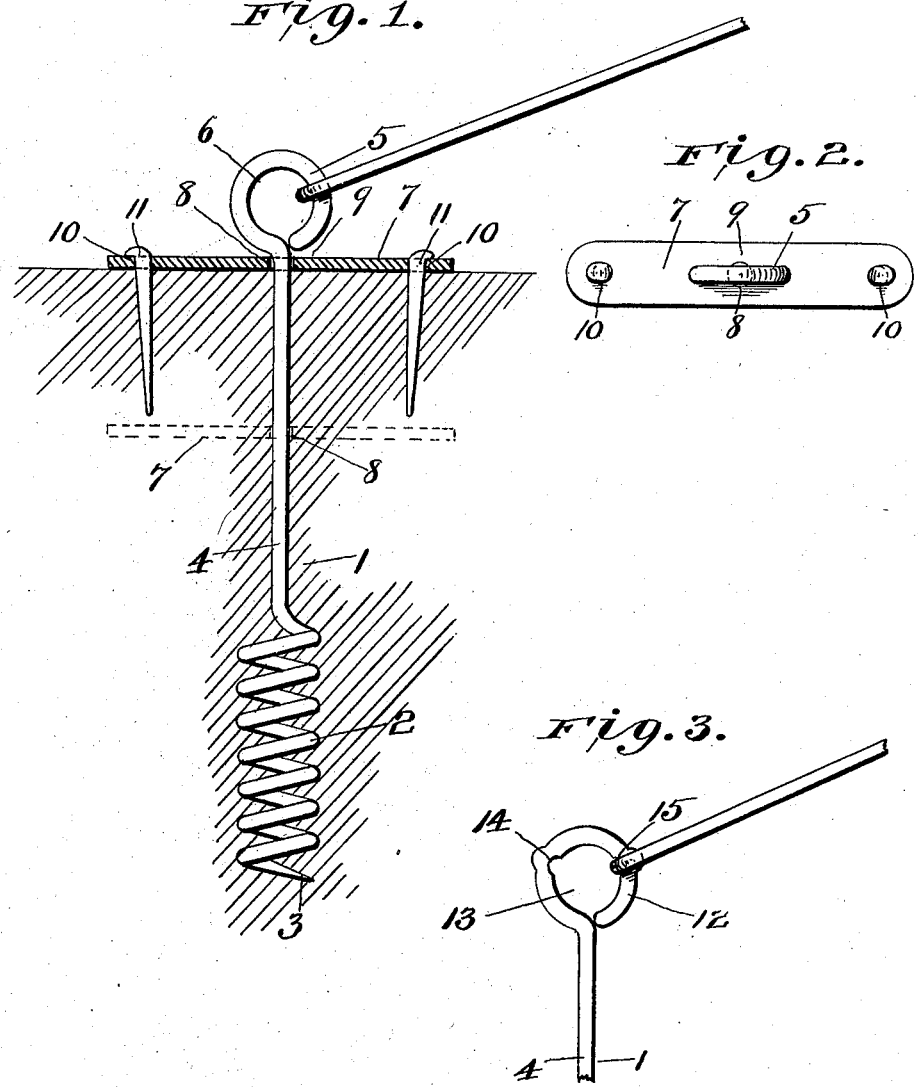
Witnesses
Lacy B. Thornton.
Walter O. Blackwood.
Inventors
Oliver Hile and Chris Rocke.
By Blackwood Bros.
Attorneys.

UNITED STATES PATENT OFFICE.

OLIVER HILE, OF PRINCETON, AND CHRISTIAN ROCKE, OF LINCOLN, NEBRASKA.

ANCHOR.

No. 815,588. Specification of Letters Patent. Patented March 20, 1906.

Application filed June 3, 1905. Serial No. 263,671.

*To all whom it may concern:*

Be it known that we, OLIVER HILE, residing at Princeton, and CHRISTIAN ROCKE, residing at Lincoln, county of Lancaster, State of Nebraska, citizens of the United States, have invented certain new and useful Improvements in Anchors; and we do declare the following to be a full, clear, and exact description of the invention, such as will enable others skilled in the art to which it pertains to make and use the same.

Our invention relates to improvements in anchors designed to be screwed into the ground and have the guy-wires of windmills, telephone and telegraph poles, posts, stakes or pegs for tents, &c., attached thereto.

The object of the invention is to provide an anchor which after being screwed into the ground will be securely and rigidly held therein, so that it cannot be withdrawn by pulling upward on the same, yet when screwed backward can be easily and quickly removed.

It still further has for its object to provide an anchor which is simple, inexpensive in construction, very durable, and easy to insert and withdraw from the ground.

The invention consists in the construction, combination, and arrangement of the several features, as more fully hereinafter described and claimed.

Referring to the drawings, Figure 1 is a side elevation of our improved anchor, showing it screwed into the ground ready for use. Fig. 2 is a top plan view of the same; Fig. 3, a detail view of a modified form of anchor-head.

In the drawings, in which like numerals of reference denote like parts throughout the several views, 1 represents the anchor, which comprises a spiral or screw 2, at its lower portion terminating in a sharp point 3, a shank 4, and a head 5, provided with an eye 6.

7 is a plate, preferably made of rigid or inflexible material, designed to be placed on or below the surface of the ground. 8 is an aperture at approximately the center 9 of said plate, and 10 designates holes at each end thereof. The central aperture 8 in plate 7 is for the purpose of receiving the anchor, and the holes 10 are for the purpose of receiving spikes or pegs 11, which are designed to be driven therethrough into the ground to securely hold said plate to the ground.

In the modified form of anchor-head shown in Fig. 3 the head is indicated as 12 and is provided with an eye 13, having notches 14 and 15 for the purpose of receiving and holding a guy or other wire and preventing it from moving around the eye 13 of the head 12.

In Fig. 1 the plate 7 is shown in full lines on the surface of the ground and in dotted lines below the surface of the ground.

In use the anchor is first screwed through the aperture 8 in the plate 7 until the head 5 thereof comes in contact with the said plate. Then the anchor is screwed into the ground and the plate 7 firmly secured to the ground by means of the spikes or pegs 11, which are driven through holes 10, said plate 7 preventing any lateral movement of the anchor. The anchor is then ready for the attachment of the guy or other wire.

When it is desired to withdraw the anchor, it is only necessary to turn the same backward.

We have shown the anchor in the drawings in a vertical position; but it may, if found desirable, for some purposes be screwed into the ground at an angle.

We do not desire to be understood as limiting ourselves to the specific details of construction and arrangement as herein described and illustrated, as it is manifest that variations and modifications may be made in the features of construction and arrangement on the adaptation of the device to various conditions of use without departing from the spirit and scope of our invention and improvements. We therefore reserve the right to all such variations and modifications as properly fall within the scope of our invention and the terms of the following claims.

What is claimed is—

1. An anchor comprising a head having an eye designed to receive a guy-wire and a shank integral with said head and eye, and terminating in a screw, an inflexible flat rigid plate made in one piece and provided with an aperture through which the screw and shank portions of said anchor are passed, said head contacting with the plate, and means independent of said plate for securing it to the ground, substantially as described.

2. An anchor provided with a head having an eye with notches and a plate for preventing the lateral movement of said anchor, substantially as described.

3. An anchor provided with a head having an eye with notches for preventing a guy or other wire from moving around said eye, substantially as described.

In testimony whereof we affix our signatures in presence of two witnesses.

OLIVER HILE.
CHRIS. ROCKE.

Witnesses:
JOHN S. BISHOP,
JENNIE M. HITCHCOCK.